United States Patent [19]

Susuki et al.

[11] 3,856,614
[45] Dec. 24, 1974

[54] FOAMED MATERIALS OF SYNTHETIC RESIN AND LAMINATIONS COMPRISING THE SAME

[75] Inventors: Rinnosuke Susuki, Tokyo; Hiroshi Hoshi, Narashino; Jiro Saito, Tokyo; Koichi Takano, Tokyo; Kiyoshi Yoshikawa, Tokyo, all of Japan

[73] Assignee: Lion Fat and Oil Co., Ltd., Tokyo, Japan

[22] Filed: Sept. 22, 1971

[21] Appl. No.: 182,733

[30] Foreign Application Priority Data
Sept. 30, 1970  Japan.............................. 45-97449
Sept. 30, 1970  Japan.............................. 45-97450

[52] U.S. Cl.................. 161/159, 161/160, 161/161, 161/162, 161/403, 260/2.5 B, 260/2.5 FP, 260/2.5 HA, 260/29.6 S
[51] Int. Cl........................... B32b 3/26, B32b 5/18
[58] Field of Search .......... 161/160, 162, 161, 168, 161/403, 159; 260/2.5 B, 2.5 FP, 2.5 HA, 29.6 S; 264/DIG. 17

[56] References Cited
UNITED STATES PATENTS

| | | | |
|---|---|---|---|
| 3,378,612 | 4/1968 | Dietz.......................... | 161/161 UX |
| 3,411,967 | 11/1968 | Rowland et al..................... | 161/161 |
| 3,451,842 | 6/1969 | Kurz et al................... | 117/138.8 U |
| 3,630,820 | 12/1971 | Leach................................ | 161/168 |

Primary Examiner—William J. Van Balen
Attorney, Agent, or Firm—Cushman, Darby & Cushman

[57] ABSTRACT

Plastic materials are disclosed, which have a foamed or laminated structure and are suitable as construction materials and furniture materials. They are very superior in the mechanical strength and difficultly combustible. Even if they catch fire, no poisonous gases are produced.

8 Claims, 6 Drawing Figures

FOAMED MATERIALS OF SYNTHETIC RESIN AND LAMINATIONS COMPRISING THE SAME

This invention relates to plastic materials suitable for use as construction materials and furniture materials. More particularly, the invention concerns foamed materials of synthetic resin and laminations comprised of the same, which are difficulty combustible and will not emit poisonous gases even if they catch fire.

Presently, there are available a variety of foamed resin materials for various purposes. These foamed materials have common inherent drawbacks such as high cost, low shock resistance and poor capability of processing. Thus, as the construction material, they lack in durability. Also, restrictions are imposed upon the cutting and attaching means. Further, they present the problems of high combustibility and poisonous gas generation when they are burned.

The present invention has been made to eliminate the above drawbacks inherent in the conventional foamed resin materials.

An object of the invention is to provide a foamed material of synthetic resin and laminations of the same, which is difficultly combustible and will not emit any poisonous gas even when they are burned.

A second object of the invention is to provide a foamed material of synthetic resin and laminations comprising the same, for which a variety of combinations of material portions of different characters and properties can be selectively used depending upon specific applications.

A third object of the invention is to provide a foamed material of synthetic resin and laminations comprising the same, which is excellent in shock resistance, heat resistance, hardness and proof of all weathers.

A fourth object of the invention is to provide a foamed material of synthetic resin and laminations comprising the same, which is excellent in heat insulating property, sound absorbing property, and cushioning property, light in weight and has comfortable touch and appearance.

A fifth object of the invention is to provide a foamed material of synthetic resin and laminations comprising the same, which can find itself in extensive applications, for example as interior finish materials for buildings and making of concrete forms.

A sixth object of the invention is to provide a foamed material of synthetic resin and laminations comprising the same, which can be manufactured on a mass production basis to widely reduce the cost.

The above and other objects, features and advantages of the invention will become more apparent from the following description having reference to the accompanying drawing, in which.

Figure 5:
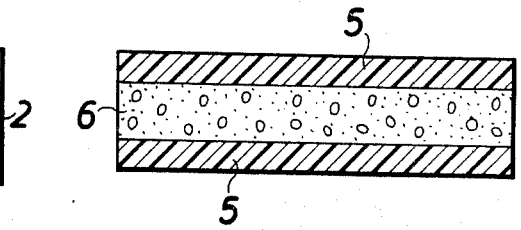
Figure 6:
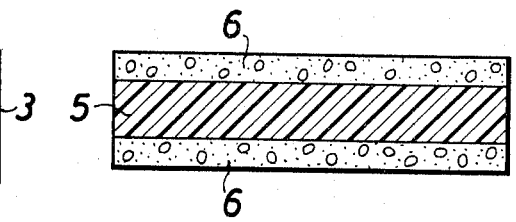

FIG. 5 is a sectional view of a fifth embodiment of the plastic material having a sandwitch-like laminated structure consisting of an intermediate foamed layer sandwitched between opposite non-foamed surface layers; and FIG. 6 is a sectional view of a sixth embodiment of the plastic material having a sandwitch-like laminated structure consisting of an intermediate non-foamed layer sandwitched between opposite foamed surface layers.

Figure 1:
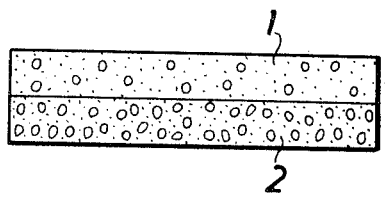
FIG. 1 is a sectional view of a first embodiment of the plastic material having a laminated structure consisting of two different foamed plastic layers.
Figure 2:
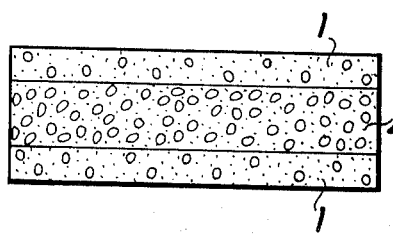
FIG. 2 is a sectional view of a second embodiment of the plastic material having a sandwich-like laminated structure.

FIG. 1 shows a first embodiment of the material constituted by two different foamed layers. FIG. 2 shows a second embodiment of the material having a sandwitch-like laminated structure.

In the lamination of FIG. 1, a foamed plastic layer 1 of one kind is made integral with a second foamed plastic layer 2 of a different kind by means of thermal fusion, adhesive and so forth. In the lamination of FIG. 2, upper and lower foamed plastic layers 1 are made integral with a second intermediate foamed plastic layer 2 by means similar to the lamination of FIG. 1. The foamed plastic layer 1 in either laminated structure is formed by foaming a resin composition containing one or more synthetic homopolymer resin materials and 1 to 95 percent of filler such as calcium sulfite or gypsum alone or a mixture thereof. The second foamed plastic layer 2 in either lamination is different from the first layer in the kind of resin and filler materials or their proportions or in the extent of foaming.

According to the invention, the synthetic homopolymer resin material may be a thermoplastic resin such as polyethylene, polypropylene and polyvinyl chloride or a co-polymer thereof. These resin materials may be used either singly or as a mixture. The content of the filler, which is an inorganic filler, is suitably selected within the above range. Its particularly preferable range is between 10 and 90 percent by weight. According to the invention, it is a great advantage that incorporation of a great quantity of the filler will not result in the reduction of the mechanical strength and moldability of the resultant mixture. The grain size of the filler added to the synthetic homopolymer resin is not limited, but it is preferably less than 500 microns.

If the gypsum is to be used as the filler, it may be dehydrated gypsum, half-dehydrated gypsum or non-dehydrated gypsum.

The laminated structures of FIGS. 1 and 2 are by no means limitative, but it is free to select a desired number of constituent layers of the lamination to suit specific uses. Also, the thickness of the layer may be freely selected. For example, the surface layer may be as thin as a sheet, which may be prepared by spraying or coating a fused resin composition or a solution of the resin composition in a suitable solvent such as a hydrocarbon solvent on a preformed laminated structure. Also, the preformed structure may be immersed in the aforementioned solution to form the surface layer.

Figure 3:
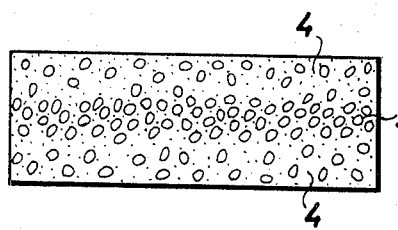
FIG. 3 is a sectional view of a third embodiment of the plastic material having an integrally foamed structure.

FIG. 3 shows a third embodiment of the material according to the invention. This material, unlike the laminated materials of FIGS. 1 and 2, does not have any laminated structure, but it is a single foamed body having intermediate highly foamed part 3 and less formed surface parts 4.

According to the invention, the foamed body or layer may be obtained by treating an admixture, for instance containing a thermoplastic resin, an inorganic filler, a bridging agent and a foaming agent, in the usual foaming method. To obtain the foamed body as shown in FIG. 3 in which the extent of foaming is not uniform, raw material sublayers having different contents of the foaming agent may be suitably stacked prior to the foaming process.

As the foaming agent according to the invention, usual ones such as benzene sulfonylhydrazide, toluene sulfonylhydrazid and azodicarboamide may be used. Its suitable content ranges between 0.1 to 5 percent by weight of the resultant admixture. In the case of using gypsum having a crystal structure including water molecules such as half-dehydrated or non-dehydrated gypsum as the inorganic filler, the mixture of the resin may be foamed without using any foaming agent by heating the pressurized mixture in a metal autoclave followed by suddenly reducing the pressure, thereby evaporating water molecules in the gypsum crystals to form a porous structure.

As is described, the material according to the invention may have a laminated structure consisting of two or more kinds of foamed sublayers different from one another in the kinds and proportions of component resin and filler and/or in the extent of foaming, with the sublayers laminated by means of thermal fusion, adhesive and/or the like, or it may be a single body or layer of a foamed structure with a gradient of foaming. The kinds of the resin and filler, the proportions thereof and the extent of foaming may be appropriately selected to suit specific uses.

For example, as a material for flooring purposes requiring a high surface hardness, a foamed layer foamed to a low extent and composed of polyethylene or polyvinyl chloride and a great quantity of filler may be used for the surface layer, while using a foamed layer foamed to a higher extent and having a lower filler content as the intermediate layer or layers. By so doing, flooring materials having excellent heat insulating and sound absorbing characters and a high surface hardness may be obtained. As a material requiring a high shock resistance, a foamed layer foamed to a high extent and composed of polyethylene and calcium sulfite may be used as the intermediate layer, while using a foamed layer composed of a great quantity of ethylene-vinylacetate (EVA) added to the above composition to improve the shock resistance and foamed to a lower extent as the surface layers for reinforcing the intermediate layer.

To improve the surface touch while maintaining the mechanical strength of the material, a foamed layer having a low filler content and foamed to a high extent may be used as the surface layers, while using the aforesaid high shock resistance layer as the intermediate layer.

As mentioned earlier, the mechanical strength and moldability of the synthetic resin in each foamed layer may be maintained even if the layer contains a great quantity of the inorganic filler. Besides, excellent properties of the inorganic filler such as difficulty to catch fire, heat-resisting property, hardness, immunity to weather and so forth may be imparted to the layer. Further, since the gypsum and calcium sulfite as the filler are very inexpensive, they can serve as the extending agent and widely reduce the material cost. Of course, the heat insulating property, sound absorbing property, lightness in weight and cushioning property as well as appearance and touch that are inherent in the foamed body are maintained.

While the foamed body or layer according to the invention difficultly catches fire, even if it catches fire the incombustible inorganic filler acts like a kind of a metal net, so that the possibility of incomplete combustion as a result of coagulation of combusted products on the surface of the material and the resultant prevention of air flow to generate poisonous gases such as carbon monoxide as is usually the case with the conventional resin materials can be totally eliminated. Moreover, it is an advantage of the invention to be able to extremely reduce the resin content of the overall composition.

Further, the foamed body according to the invention may have dense surface layers on opposite sides of the intermediate finely foamed structure for reinforcing the mechanical strength and improving the heat-resisting property and hardly combustible property of the foamed body.

Figure 4:
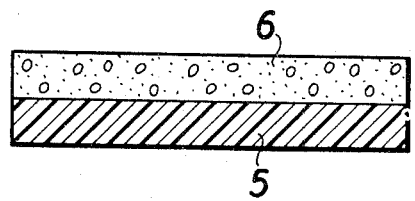
FIG. 4 is a sectional view of a fourth embodiment of the plastic material having a laminated structure consisting of a non-foamed plastic layer and a foamed plastic layer.

FIGS. 4 to 6 show further embodiments of the material according to the invention. In the Figures, numeral 5 designates a plastic layer made of a resin composition containing one or more synthetic resins and 1 to 90 weight percent of filler such as calcium sulfite or gypsum alone or a mixture thereof. Numeral 6 designates a foamed layer formed by foaming the similar resin composition to the afore-described compositions. The kinds and proportions of the synthetic resin and filler in the former layer may be the same as or different from those in the latter layer. These layers are integrally laminated in the same manner as in the previous embodiments of FIGS. 1 and 2, that is, the (non-foamed) plastic layer or layers and foamed plastic layer or layers integrally laminated by means of thermal fusion, adhesive, coating and so forth. The kinds of the resin and filler as well as their proportions of the individual layers may be appropriately selected to suit specific applications.

For example, as a material for flooring purposes requiring a high surface resistance, a non-foamed layer composed of polyethylene or polyvinyl chloride and a great quantity of filler may be used for the surface layer or layers, while using a foamed layer having a lower filler content as the intermediate layer or layers. By so doing, flooring materials having an excellent heat insulating property and a high surface hardness and very light in weight may be obtained. As a material requiring a high shock resistance, a foamed layer composed of polyethylene and calcium sulfite may be used as the intermediate layer or layers, while using a non-foamed layer containing a great quantity of EVA incorporated to improve the shock resistance as the surface layers for reinforcing the intermediate layer or layers.

To improve the surface touch while maintaining the mechanical strength of the material, a foamed layer having a relatively low filler content may be used as the surface layers, while using the aforesaid high shock resistance layer as the intermediate layer. By so doing, it is possible to obtain a material for construction purposes, which has soft touch and excellent heat insulating, sound absorbing and cushioning properties.

The materials having a foamed surface layer on one or both sides of the laminated structure as shown in FIGS. 4 and 6 may be used to construct concrete forms with the foamed side directed to the outside. With their excellent appearance and touch, they can serve as the finish materials without being removed after the solidification of concrete. The non-foamed material can also be substituted for the conventional material for constructing concrete forms, because of its tenacity and light weight.

The following examples are given to show preferred compositions of the surface and intermediate layers of the laminated material.

Example 1

As the surface layer, the following composition was used:
| | |
|---|---|
| Medium or low tension polyethylene | 35 weight percent |
| Calcium sulfite | 64 weight percent |
| Benzene sulfonylhydrazide (foaming agent) | 0.5 weight percent |
| Ter-butylperoxide (bridging agent) | 0.5 weight percent |

The above composition was foamed into three times the original volume, from which a board having a thickness of 5 mm was formed.

As the second layer, the following composition was used:
| | |
|---|---|
| Medium or low tension polyethylene | 65 weight percent |
| Calcium sulfite | 33 weight percent |
| Benzene sulfonylhydrazide (foaming agent) | 1.5 weight percent |
| Ter-Butylperoxide (bridging agent) | 0.5 weight percent |

The above composition was foamed into 10 times the original volume, from which a board having a thickness of 12 mm was formed.

The first and second layers thus obtained were bonded together by a hot-melt type adhesive to obtain a laminated material for flooring purposes having a high surface hardness and excellent heat insulating and sound absorbing properties.

Example 2

As the surface layer, the following composition was used:
| | |
|---|---|
| Medium or low tension polyethylene | 25 weight percent |
| EVA | 40 weight percent |
| Calcium sulfite | 34 weight percent |
| Azodicarboamide (foaming agent) | 0.5 weight percent |
| Ter-butylperoxide | 0.5 weight percent |

As the second layer, the following composition was used:
| | |
|---|---|
| Medium or low tension polyethylene | 65 weight percent |
| Calcium sulfite | 33 weight percent |
| Azodicarboamide | 1.5 weight percent |
| Ter-butylperoxide | 0.5 weight percent |

The above surface layer or layers and the second layer or layers were appropriately combined and foamed to obtain a plastic foamed body having a high shock resistance and difficult combustibility.

Example 3

As the surface layer, the following composition was used:
| | |
|---|---|
| Medium or low tension polyethylene | 73 weight percent |
| Calcium sulfite | 25 weight percent |
| Azodicarboamide | 1.5 weight percent |
| Ter-butylperoxide | 0.5 weight percent |

As the second layer, the following composition was used:

| | |
|---|---|
| Medium or low tension polyethylene | 25 weight percent |
| EVA | 40 weight percent |
| Calcium sulfite | 24 weight percent |
| Gypsum | 10 weight percent |
| Azodicarboamide | 0.5 weight percent |
| Ter-butylperoxide | 0.5 weight percent |

The above composition of the surface layer was foamed into 10 times the original volume, from which a sheet having a thickness of about 2 mm was formed. The above composition of the second layer is formed into three times the original volume, from which a board having a thickness of 10 mm is formed. Both the layers thus obtained were bonded together by a hot-melt type adhesive to obtain a laminated material having soft touch and excellent shock resistance.

Example 4

As the surface layer, the following composition was used:
| | |
|---|---|
| Medium or low tension polyethylene | 25 weight percent |
| Calcium sulfite | 45 weight percent |
| Gypsum | 30 weight percent |

The above composition is kneaded with a mixer and the resultant paste was extrusion molded into a board having a thickness of 5 mm.

As the second layer, the following composition was used:
| | |
|---|---|
| Medium or low tension polyethylene | 65 weight percent |
| Calcium sulfite | 33 weight percent |
| Benzene sulfonylhydrazide (foaming agent) | 1.5 weight percent |
| Ter-butylperoxide (bridging agent) | 0.5 weight percent |

The above composition was foamed into ten times the original volume, from which a board having a thickness of 12 mm was formed. The first and second layers thus obtained was bonded together by a hot-melt type adhesive to obtain a light laminated material for flooring having a high surface hardness, an excellent heat insulating property and difficult combustibility.

Example 5

As the surface layer, the following composition was used:
| | |
|---|---|
| Medium or low tension polyethylene | 25 weight percent |
| EVA | 30 weight percent |
| Calcium sulfite | 45 weight percent |

As the second layer, the following composition was used:

| | |
|---|---|
| Medium or low tension polyethylene | 65 weight percent |
| Calcium sulfite | 33 weight percent |
| Azodicarboamide | 1.5 weight percent |
| Ter-butylperoxide | 0.5 weight percent |

The above composition of the surface layer was rendered into a board having a thickness of 5 mm in the same manner as in the preceding example. The above composition of the second layer was foamed into ten times the original volume, from which a board having a thickness of 10 mm was formed. Both the layers thus obtained were integrally laminated by a thermal press to obtain a laminated material having a high shock resistance and difficult combustibility.

Example 6

As the surface layer, the following composition was used:
| | |
|---|---|
| Medium or low tension polyethylene | 73 weight percent |
| Calcium sulfite | 25 weight percent |
| Azodicarboamide | 1.5 weight percent |
| Ter-butylperoxide | 0.5 weight percent |

As the second layer, the following composition was used:

| | |
|---|---|
| Medium or low tension polyethylene | 25 weight percent |
| EVA | 40 weight percent |
| Calcium sulfite | 25 weight percent |
| Gypsum | 10 weight percent |

The above composition of the surface layer was foamed into 10 times the original volume, from which a sheet having a thickness of 2 mm was formed. The above composition of the second layer is rendered into a board having a thickness of 10 mm in the same manner as in the preceding example. Both the layers thus obtained were bonded together by a hot-melt type adhesive into a laminated material having soft touch and excellent shock resistance.

What is claimed is:

1. A foamed thermoplastic lamination comprising at least two foamed layers bonded to one another in laminated relationship, each layer being a foamed thermoplastic resin material selected from the group of homopolymers, copolymers thereof, and mixtures thereof, and further containing a filler selected from the group consisting of calcium sulfite, gypsum and mixtures thereof in admixture with said thermoplastic resin material, said foamed layers being foamed to extents different from one another.

2. The foamed thermoplastic lamination according to claim 1, wherein at least one of said layers is composed of a resin composition which has been foamed into ten times the original volume thereof, and at least one other layer is composed of a resin composition which has been foamed into three times the original volume thereof.

3. The foamed thermoplastic lamination according to claim 1 wherein said thermoplastic homopolymers are polyethylene, polypropylene, or polyvinyl chloride.

4. The foamed thermoplastic lamination according to claim 1, wherein said gypsum is di-hydrate, hemi-hydrate, or de-hydrate.

5. The foamed thermoplastic lamination according to claim 1, wherein said individual foamed layers have resin compositions which are different from one another in the kind of the thermoplastic resin material.

6. The foamed thermoplastic lamination according to claim 1, wherein said individual foamed layers have resin compositions which are different from one another in the kind of the filler material.

7. The foamed thermoplastic lamination according to claim 1, wherein said inorganic filler is incorporated at 10 – 90 percent by weight.

8. A foamed thermoplastic lamination consisting essentially of at least two foamed layers bonded to each other in laminated relationship, the at least two foamed layers being foamed to different extents, said layers consisting essentially of a thermoplastic resin material selected from the group consisting of thermoplastic homopolymers, copolymers thereof, and mixtures thereof, and from 1 – 95 percent by weight of a filler selected from the group consisting of calcium sulfite, gypsum, and mixtures thereof, said filler being admixed with said thermoplastic resin material, at least one of said layers being foamed to at least ten times the original volume thereof, and at least one other of said layers being foamed to about three times the original volume thereof.

* * * * *